United States Patent
Kim et al.

(10) Patent No.: US 9,736,766 B2
(45) Date of Patent: Aug. 15, 2017

(54) METHOD FOR FINDING INSTRUMENT FOR WI-FI DIRECT P2P (PEER TO PEER) COMMUNICATION AND APPARATUS THEREFOR

(71) Applicant: LG Electronics Inc., Seoul (KR)

(72) Inventors: Suhwook Kim, Seoul (KR); Jinyoung Chun, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 14/767,060

(22) PCT Filed: Feb. 21, 2014

(86) PCT No.: PCT/KR2014/001426
§ 371 (c)(1),
(2) Date: Aug. 11, 2015

(87) PCT Pub. No.: WO2014/129844
PCT Pub. Date: Aug. 28, 2014

(65) Prior Publication Data
US 2015/0382287 A1    Dec. 31, 2015

Related U.S. Application Data

(60) Provisional application No. 61/767,255, filed on Feb. 21, 2013.

(51) Int. Cl.
| | |
|---|---|
| H04W 48/16 | (2009.01) |
| H04W 8/00 | (2009.01) |
| H04W 76/02 | (2009.01) |
| H04W 84/12 | (2009.01) |

(52) U.S. Cl.
CPC ........... *H04W 48/16* (2013.01); *H04W 8/005* (2013.01); *H04W 76/023* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2007/0127478 A1* | 6/2007 | Jokela | H04L 12/1881 370/390 |
| 2009/0296617 A1* | 12/2009 | Lin | H04W 76/048 370/311 |
| 2011/0149806 A1 | 6/2011 | Verma et al. | |
| 2012/0243524 A1 | 9/2012 | Verma et al. | |

(Continued)

FOREIGN PATENT DOCUMENTS

| | | |
|---|---|---|
| KR | 1020120045628 | 5/2012 |
| WO | 2012096546 | 7/2012 |
| WO | 2012115385 | 8/2012 |

*Primary Examiner* — Andrew Lai
*Assistant Examiner* — Jamaal Henson
(74) *Attorney, Agent, or Firm* — Dentons US LLP

(57) ABSTRACT

The present invention relates to a method for performing communication between terminals (D2D). Specifically, the method is characterized in that when a terminal communicating with another terminal is to perform an additional communication with yet another terminal, the channel sequence of the communicating terminal is determined, and one of the two terminals communicating with each other is defined as the channel synchronization reference terminal performing synchronization.

11 Claims, 10 Drawing Sheets

(56) References Cited

U.S. PATENT DOCUMENTS

2013/0065627 A1* 3/2013 Jung .................... H04L 67/104
                                                                          455/515
2013/0148545 A1* 6/2013 Jung .................... H04W 48/16
                                                                          370/255

* cited by examiner first WFD device (cellular phone)  second WFD device (display device)

METHOD FOR FINDING INSTRUMENT FOR WI-FI DIRECT P2P (PEER TO PEER) COMMUNICATION AND APPARATUS THEREFOR

This application is a 35 USC §371 National Stage entry of International Application No. PCT/KR2014/001426 filed on Feb. 21, 2014, and claims priority to U.S. Provisional Application No. 61/767,255 filed on Feb. 21, 2013, all of which are hereby incorporated by reference in their entireties as if fully set forth herein.

TECHNICAL FIELD

The present invention relates to a wireless communication system, and more particularly, to a method of performing WFD P2P communication and an apparatus therefor. In more particular, the present invention relates to a method of discovering a device for performing WFD P2P communication and an apparatus therefor.

BACKGROUND ART

Recently, a wireless communication system is widely developing to provide a communication system of various types such as audio, data and the like. In general, a wireless communication system corresponds to a multiple access system capable of supporting communication with multiple users by sharing an available system resource (bandwidth, transmit power and the like). Examples of the multiple access system include a CDMA (Code Division Multiple Access) system, an FDMA (Frequency Division Multiple Access) system, a TDMA (Time Division Multiple Access) system, an OFDMA (Orthogonal Frequency Division Multiple Access) system, an SC-FDMA (Single Carrier Frequency Division Multiple Access) system and the like.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying OFDM (orthogonal frequency division multiplexing) on 2.4 GHz. IEEE 802.11n provides transmission speed of 300 Mbps by applying MIMO-OFDM (multiple input multiple output-orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

DISCLOSURE OF THE INVENTION

Technical Task

One object of the present invention is to provide a method of efficiently performing WFD (wireless fidelity direct) P2P (peer to peer) communication in a wireless communication system and an apparatus therefor. Another object of the present invention is to provide a method of efficiently discovering a neighbor for WFD P2P communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, a method of performing device discovery in a wireless communication system supporting Wi-Fi Direct, the method comprising: scanning all available channels scanned by a first device; transmitting a probe request message is transmitted by the first device to a second device; and receiving a probe response message from the second device in response to the probe request message, wherein the first device is configured to transmit a probe request message in a search mode (search state) and receive a probe request message from a different device in a listen mode (listen state), and wherein operation time of the first device operating in the listen mode is determined based on an application of a Wi-Fi Direct service (WFDS) to be used by the first device with the second device.

To further achieve these and other advantages and in accordance with the purpose of the present invention, the operation time of the first device operating in the listen mode of when the application is related to a service with devices equal to or less than a prescribed number is configured to be longer than the operation time of the first device operating in the listen mode of when the application is related to a service with devices exceeding the prescribed number.

To further achieve these and other advantages and in accordance with the purpose of the present invention, if the first device operates in the search mode, a communication channel is configured according to every specific application.

To further achieve these and other advantages and in accordance with the purpose of the present invention, minimum standby time, which is taken until the probe response message is received from the second device after the probe request message is transmitted to the second device by the first device, of when the application is related to a service with devices equal to or less than a prescribed number is configured to be shorter than the minimum standby time of when the application related to a service with devices exceeding the prescribed number.

To further achieve these and other advantages and in accordance with the purpose of the present invention, time of scanning all available channels scanned by the first device, of when the application is related to a service with devices equal to or less than a prescribed number is configured to be longer than the time of scanning of when the application is related to a service with devices exceeding the prescribed number.

To further achieve these and other advantages and in accordance with the purpose of the present invention, the probe request message corresponds to a message transmitted by the first device operating in the search mode and wherein the probe response message corresponds to a message received by the first device while the second device is operating in the listen mode.

To further achieve these and other advantages and in accordance with the purpose of the present invention, the service with the devices equal to or less than the prescribed number comprises a data transfer service and a multimedia streaming service.

To further achieve these and other advantages and in accordance with the purpose of the present invention, the service with the devices exceeding the prescribed number comprises an advertisement and a social network service (SNS).

To further achieve these and other advantages and in accordance with the purpose of the present invention, a scheme of transmitting the probe request message, which is transmitted by the first device, corresponds to one selected from the group consisting of a unicast transmission scheme, a multicast transmission scheme and a broadcast transmission scheme.

To further achieve these and other advantages and in accordance with the purpose of the present invention, the Wi-Fi Direct service comprises at least one selected from the group consisting of a send service, a play service, a print service and a display service.

To further achieve these and other advantages and in accordance with the purpose of the present invention, a method of performing device discovery in a wireless communication system supporting Wi-Fi Direct, the method comprising: receiving a probe request message received by a second device from a first device; and transmitting a probe response message to the first device in response to the probe request message, wherein the second device is configured to transmit a probe request message in a search mode (search state) and receive a probe request message from a different device in a listen mode (listen state) and wherein operation time of the second device operating in the listen mode is determined based on an application of a Wi-Fi Direct service (WFDS) to be used by the second device with the first device.

To further achieve these and other advantages and in accordance with the purpose of the present invention, a first device performing device discovery in a wireless communication system supporting Wi-Fi Direct, comprising: a transceiver; and a processor, the processor configured to: control the first device to scan all available channels, transmit a probe request message to a second device, receive a probe response message from the second device in response to the probe request message, wherein the first device is configured to transmit a probe request message in a search mode (search state) and receive a probe request message from a different device in a listen mode (listen state), and wherein operation time of the first device operating in the listen mode is determined based on an application of a Wi-Fi Direct service (WFDS) to be used by the first device with the second device.

Advantageous Effects

According to embodiment of the present invention, it is able to provide a method of efficiently performing D2D (device-to-device) communication in a wireless communication system and an apparatus therefor.

In particular, according to embodiment of the present invention, when a user equipment performing channel hopping performs D2D communication with a new user equipment, it is able to provide a method of efficiently performing synchronization and an apparatus therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.16 (WiMAX), IEEE 802.20, E-UTRA (Evolved UTRA), etc. OFDM can be implemented with such a radio technology as IEEE 802.11 etc.

For clarity, the present invention is described in a manner of mainly concerning IEEE 802.11 (W-Fi), by which the technical characteristics of the present invention may be non-limited. For instance, following description can be supported by the standard documents disclosed in at least one of IEEE 802 system, a 3GPP system, 3GPP LTE/LTE-A (LTE-Advanced), and a 3GPP2 system, which correspond to wireless access systems. In particular, steps or parts among the embodiments of the present invention, which are not explained to clearly disclose the technical idea of the present invention, can be supported by the documents. And, all terminologies disclosed in the present specification can be explained by the standard document.

Moreover, in the following description, specific terminologies are provided to help the understanding of the present invention. And, the use of the specific terminology can be modified into another form within the scope of the technical idea of the present invention. Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts. And, an order of operations described in the present specification may change. Some configurations or characteristics of an embodiment can be included in a different embodiment or can be replaced with configurations or characteristics corresponding to the different embodiment.

Figure 1:
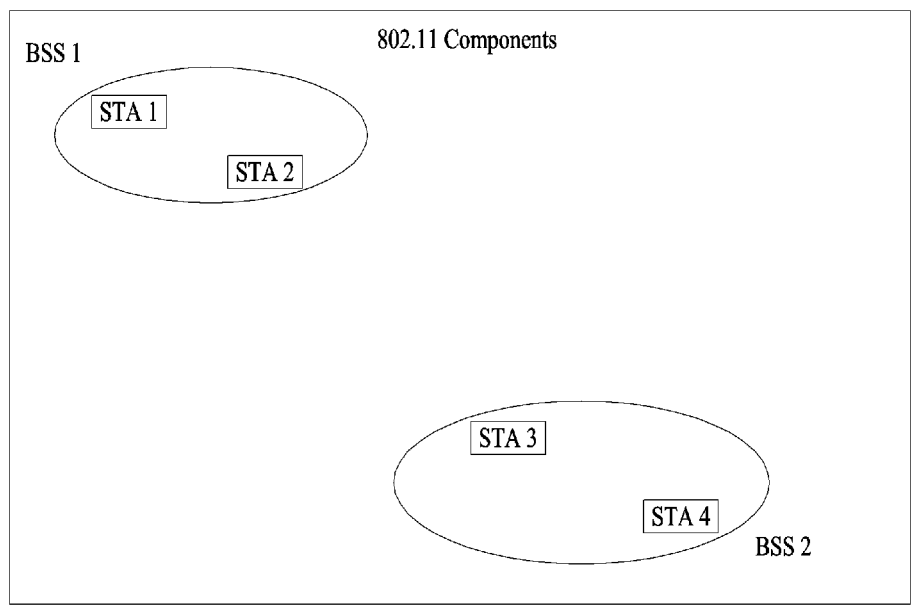
FIG. 1 is a diagram for an example of a structure of IEEE 802.11 system to which the present invention is applicable.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a terminal, a wireless transmit/receive unit (WTRU), a user equipment (UE), a mobile station (MS), a mobile terminal, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
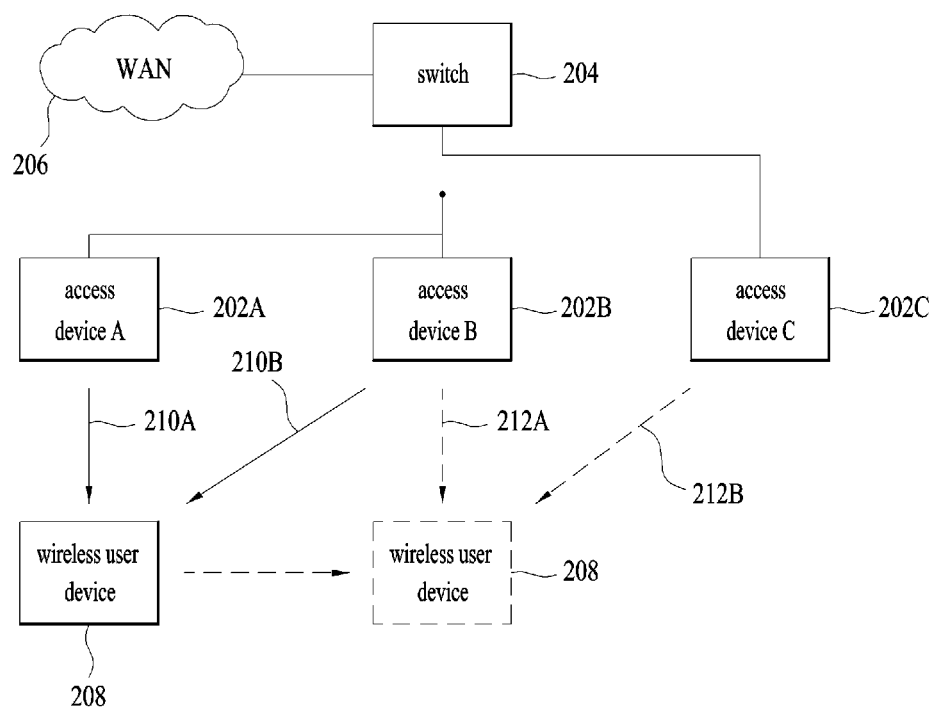
FIG. 2 is a block diagram for an example of operations of a communication system adopting access devices and wireless user devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
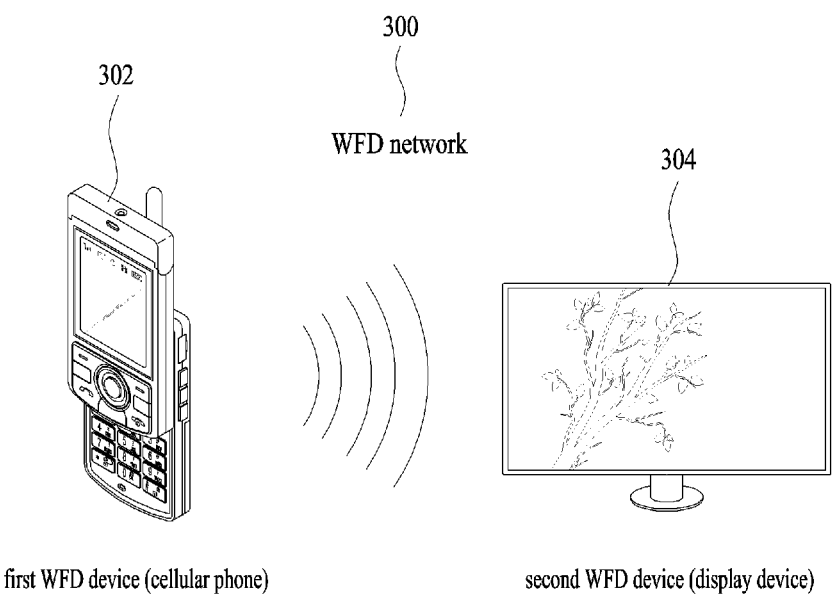
FIG. 3 is a diagram for an example of a WFD (Wi-Fi Direct) network.

FIG. 3 is a diagram for an example of a WFD (Wi-Fi Direct) network.

A WFD network corresponds to a network capable of performing D2D (device-to-device) (or peer to peer (P2P) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
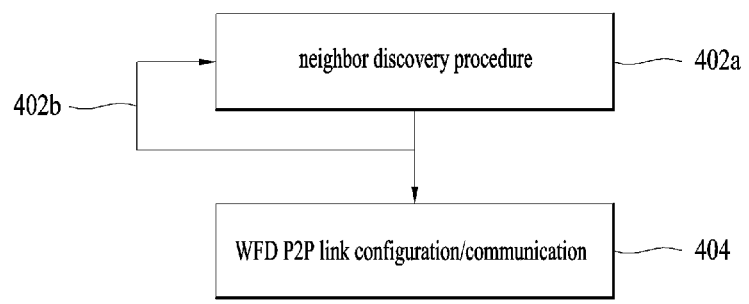
FIG. 4 is a flowchart for an example of a process of configuring a WFD network.

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 can transceive a signal with each other via a P2P link.

Figure 5:
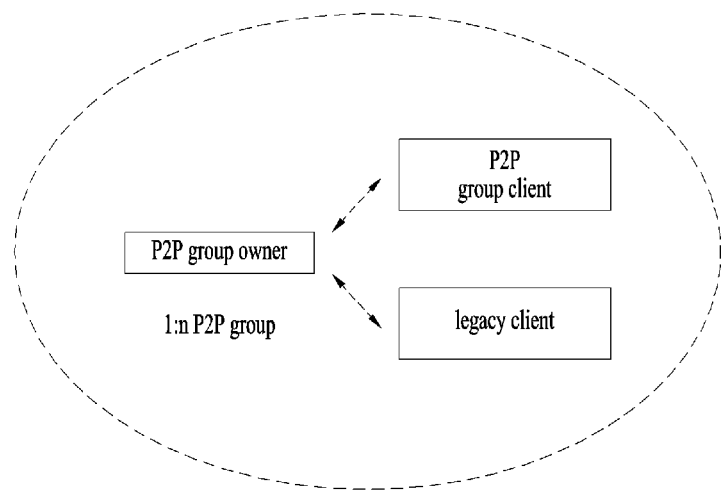
FIG. 5 is a diagram for a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
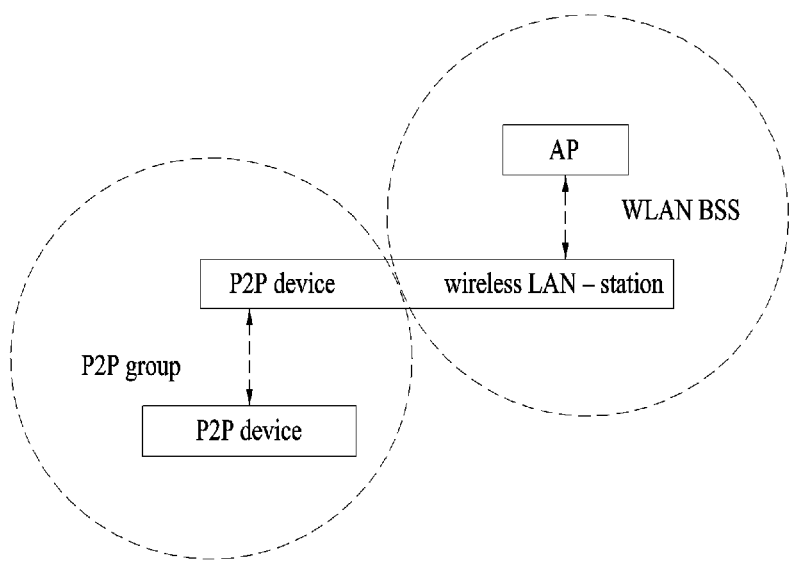
FIG. 6 is a diagram for a situation that a single P2P device forms a P2P group and is connected with an AP in a manner of operating as an STA of WLAN at the same time.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
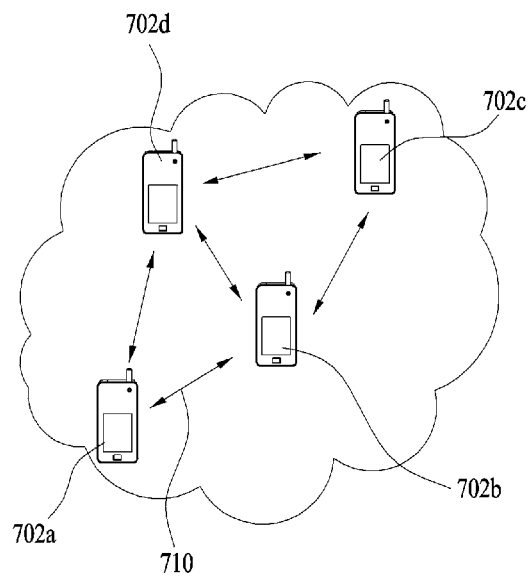
FIG. 7 is a diagram for a WFD network aspect in case that P2P is applied.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
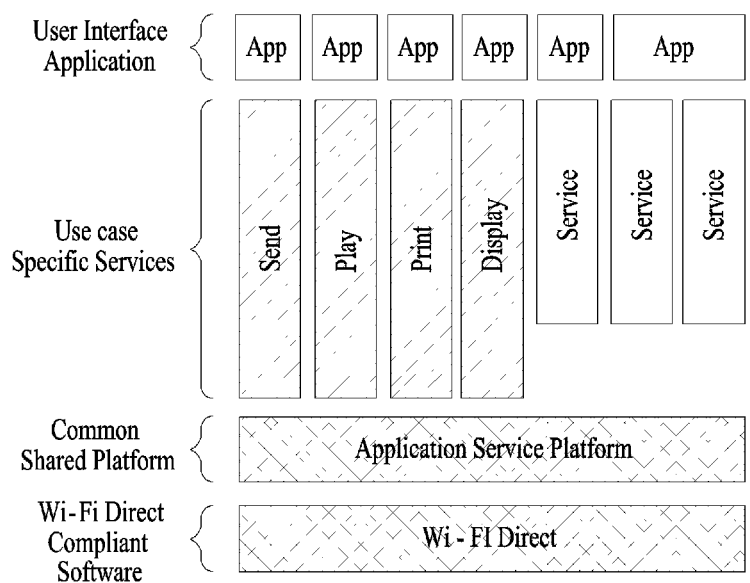
FIG. 8 is a simplified block diagram for a WFDS (Wi-Fi Direct services) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name. A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
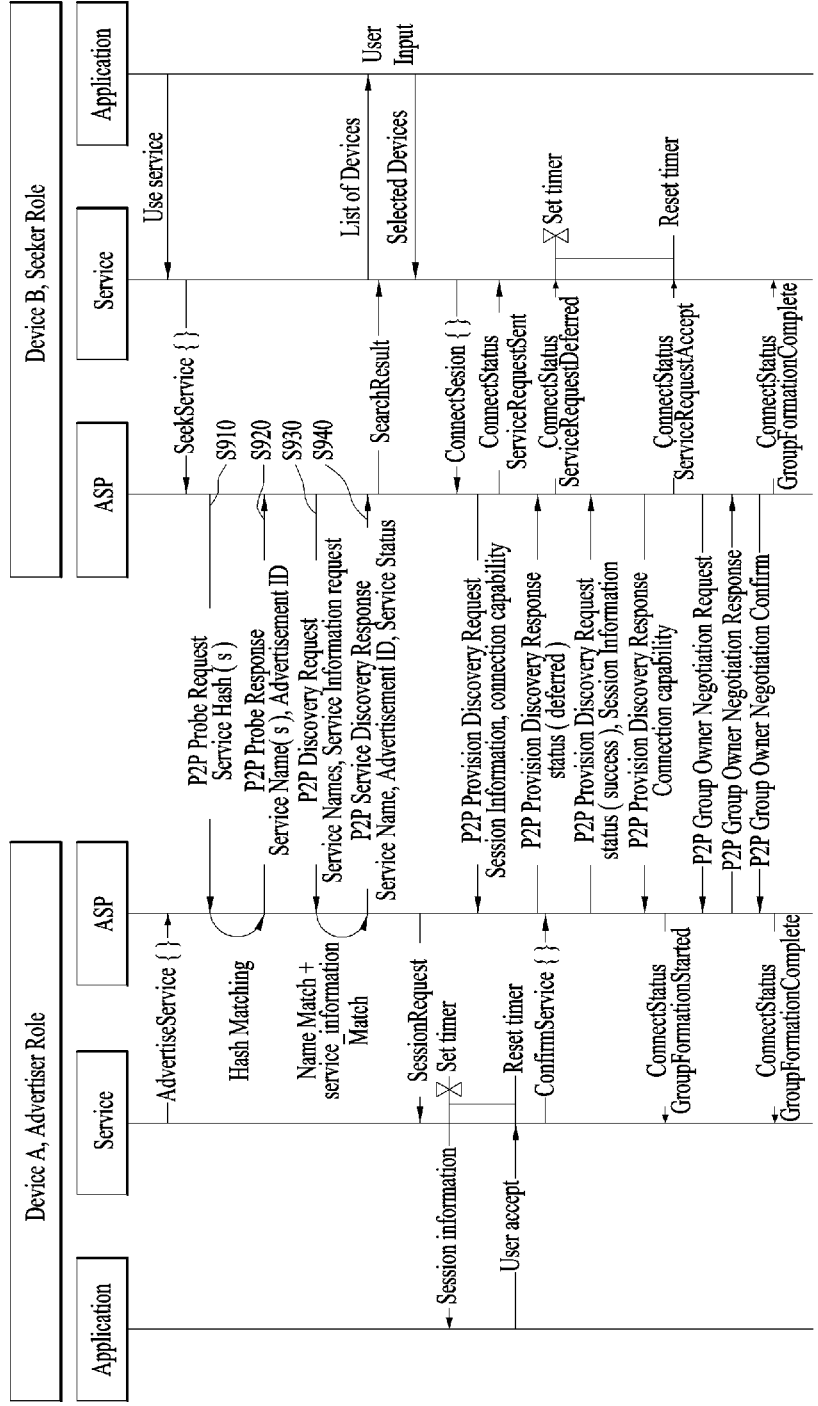
FIG. 9 is a flowchart for a process of establishing a WFDS session by discovering a device and a service between WFDS devices in a legacy WFDS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WFDS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

Before the present invention is explained, it is necessary to be cautious of one thing. It is necessary to distinguish a legacy Wi-Fi Direct connection from Wi-Fi Direct service (WFDS) connection described in the present invention. According to the legacy Wi-Fi Direct, it mainly concerns up to a L2 layer, whereas the recently discussed WFDS connection concerns not only the L2 layer but also a higher layer of the L2 layer. In particular, the WFDS connection is dealing with a service session connection performed by an application service platform. Hence, the WFDS connection may have more diversified and more complex cases compared to the legacy L2 layer connection and it is required to have definition on the cases. In addition, in case of connecting Wi-Fi Direct only between devices and in case of connecting Wi-Fi Direct service between devices, configuration and order of a control frame, which is exchanged via Wi-Fi, may become different.

Figure 10:
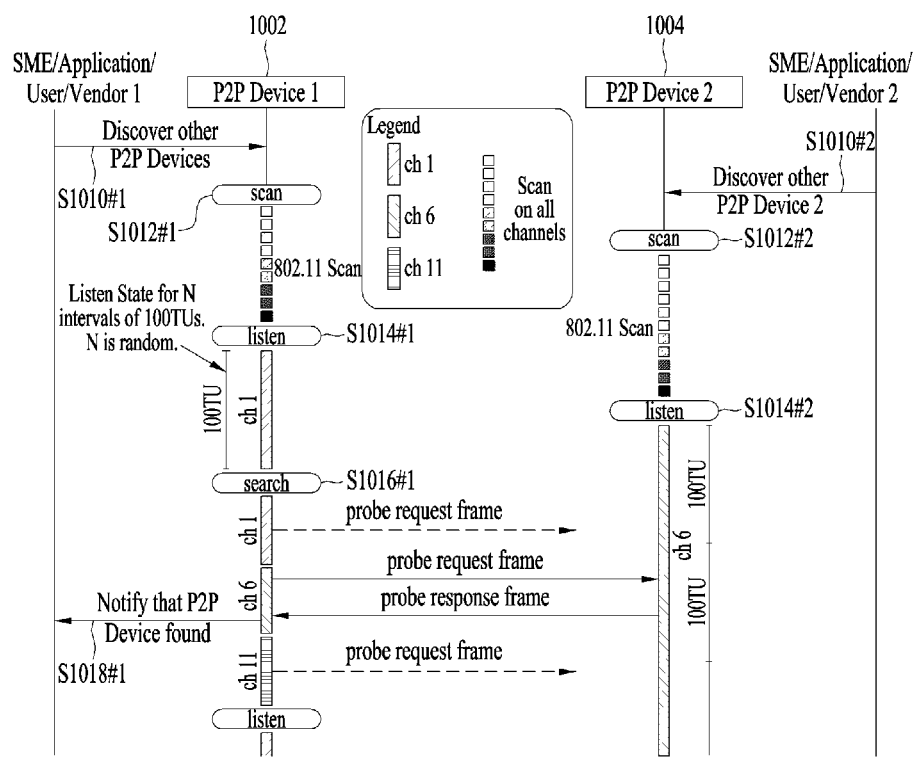
FIG. 10 is a flowchart for a process of discovering a neighbor.

FIG. 10 is a flowchart for a process of discovering a neighbor.

In FIG. 10, a device discovery procedure is described in more detail. The present example shows an example of an operation between a WFD device 302 and a WFD device 304 mentioned earlier in FIG. 4.

Referring to FIG. 10, the neighbor discovery procedure mentioned earlier in FIG. 4 can be initiated by an indication of an SME (station management entity)/an application/a user/a vendor [S1010] and the neighbor discovery procedure can be divided into a scan phase [S1012] and a find phase [S1014 to S1016]. The scan phase [S1012] includes an operation of scanning all available radio channels according to 802.11 scheme. In doing so, a P2P device can check a best operation channel. The find phase [S1014 to S1016] includes a listen mode [S1014] and a search mode [S1016] and a P2P device alternately repeats the listen mode [S1014] and the search mode [S1016]. The P2P device 302/304 performs an active search using a probe request frame in the search mode [S1016]. For a quick search, a search range can be restricted to a social channel including channel 1, 6, and 11 (2412, 2437 and 2462 MHz). And, the P2P device 302/304 maintains a reception state in a manner of selecting one channel from the 3 social channels in the listen mode [S1014]. In this case, if a probe request frame transmitted by a different P2P device (e.g., 302) in the search mode is received, the P2P device (e.g., 304) can transmit a probe response frame in response to the probe request frame. Duration of the listen mode [S1014] can be randomly given (e.g., 100, 200, 300 TU (time unit; msec)). The P2P devices can arrive at a channel common to the P2P devices in a manner of continuously repeating the search mode and the listen mode. The P2P devices find out a different P2P device and can discover/exchange a device type, a manufacturer, or a friendly device name with the P2P device using a probe request frame and a probe response frame to selectively combine with the P2P device. If a neighbor P2P device is discovered via the neighbor discovery procedure and necessary information is obtained, the P2P device (e.g., 302) can inform an SME/an application/a user/a vendor of the discovery of the P2P device [S1018].

The device discovery procedure is explained in more detail. According to a legacy device discovery procedure, a listen mode and a search mode are alternately repeated. A P2P device randomly selects a specific channel (one of channel 1, 6 and 11 on the basis of 2.4 GHz) in the listen mode and receives a probe request frame during random time (100, 200 or 300 msec (TU)). Having received the probe request frame, the P2P device transmits a probe response frame in response to the probe request frame. If the random time elapses, the P2P device switches the listen mode into the search mode again. The P2P device transmits a probe request frame while switching the channel 1, 6 and 11 in the search mode. If the P2P device does not receive a probe response frame for prescribed time after the probe request frame is transmitted, the P2P device switches to a next channel. If the P2P device wants to discover a device, the P2P device and the device should transceive device information of its own with each other. One P2P device should be in the listen mode and another P2P device should be in the search mode on specific time to transceive the device information with each other. In this case, a device discovery procedure can be performed only when a probe request frame and a probe response frame are normally transceived with each other between the P2P devices.

Yet, the legacy WFD device discovery procedure has a problem that it takes a lot of time. Since device discovery, communication establishment and release of the communication are performed in such a short time, if two P2P devices operate on an identical channel, on identical time and in modes different from each other (listen mode and search mode) to discover a counterpart device, a user practically using the P2P devices may feel inconvenience. According to an actual measurement result, delay time equal to or greater than 5 seconds is measured. Hence, it is necessary to have a method of solving the inconvenience.

Reducing Time Taken for Discovering Device

In the following, the present invention proposes a method of reducing time taken for a device discovery procedure between P2P devices.

Figure 11:
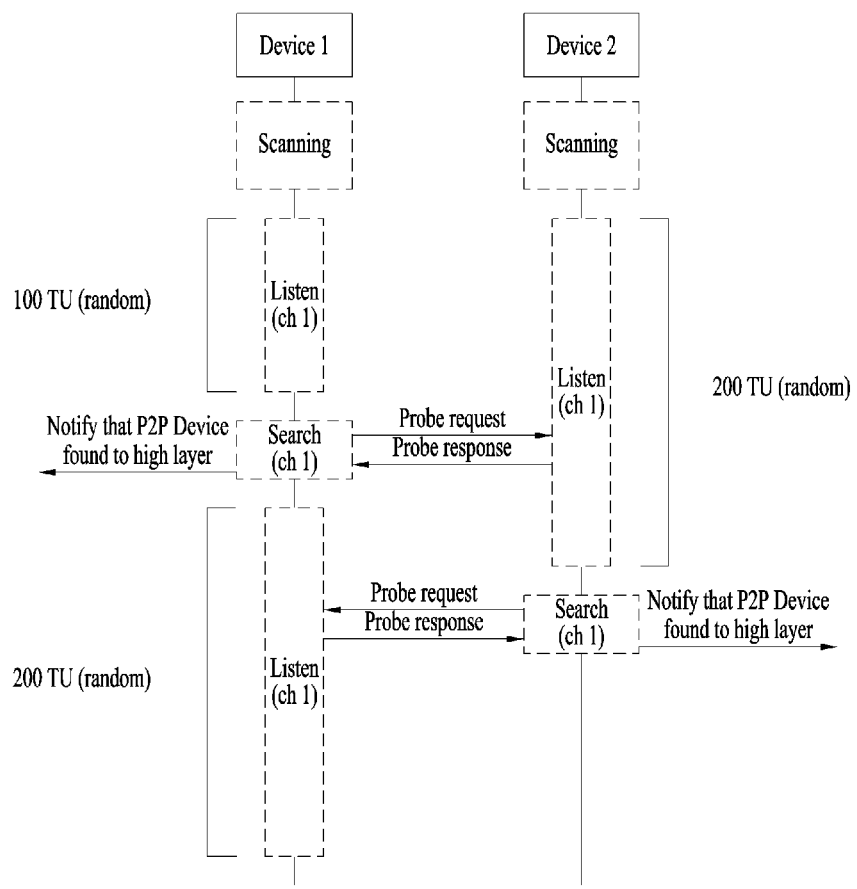
FIG. 11 is a flowchart for a process of discovering a device according to one embodiment of the present invention.

FIG. 11 is a flowchart for a process of discovering a device according to one embodiment of the present invention.

As shown in FIG. 11, there mandatorily exists time taken for discovering a device. First of all, there may exist time taken for a scanning phase that a device searches for all available channels on which the device is operable. After the scanning phase, there may exist time taken for waiting for a probe request message of a different device in a listen mode. If the probe request message is not received from the different device for prescribed time, it may be able to transmit a probe request message to the different device in a manner of switching to a search mode from a listen mode. When the probe request message is transmitted, 3 social channels (channel 1, 6 and 11) are used only. If the different device is not discovered on the channel 1, channel hopping is performed to the channel 6 (or, channel 11). By doing so, a probe request message is received in the listen mode and a probe request message is received in the search mode. If the different device is not discovered on the channel 6, channel hopping is performed to the channel 11 (or the channel 1). By doing so, it may be able to repeat the device discovery procedure. Time of operating in the listen mode of a communication channel can be controlled according to a service application to reduce time taken for the device discovery procedure to use a Wi-Fi Direct service.

Reducing Listen Mode Operation Time

The present invention proposes a method of reducing time of operating in a listen mode to reduce time taken for a first device to transmit a probe request message to a second device and receive a probe response message from the second device. According to the method proposed by the present invention, the total device discovery time can be reduced in a manner that the time of operating in the listen mode is differently determined based on an application of a Wi-Fi Direct service (WFDS) to be used between the first device and the second device.

There exist various types of a Wi-Fi Direct service (WFDS). In general, although the WFDS defines 4 basic services including a send service, a play service, a print service and a display service, other services can be included in the WFDS as well. According to the present invention, the WFDS is classified according to whether a service application is used by the small numbers of users or the many numbers of users instead of the aforementioned 4 basic services.

First of all, a service application used by the small numbers of users may correspond to a service used by the small number of device users. For instance, the service may include data transfer or multimedia streaming. In case of the data transfer, since a specific device transmits data to a preferred device or a device preferred to perform the data transfer transmits data after being authenticated, a user using the service is limitative and the small number of users, which is equal to or less than a prescribed number, use the service in general. In case of the multimedia streaming, since contents supporting a charged service require authentication and such a limitative service as authentication in a transmission device or a reception device is provided, the small number of users, which is equal to or less than a prescribed number, use the multimedia streaming.

On the contrary, a service application used by the many numbers of users may include an advertisement or a social network service (SNS) for example. In case of the advertisement, since information is transmitted to specified masses or unspecified masses in general, the advertisement can be recognized as a service used by the many numbers of users. In case of the social network service, the SNS can perform not only one-to-one (1:1) service but also one-to-many (1: many) service. Hence, the SNS can be recognized as a service used by the many numbers of users. Although the service used by the small numbers of users and the service used by the many numbers of users are explained with reference to the example, by which the present invention may be non-limited. It is necessary to be cautious in that it is preferable to classify a service application according to a form of practically using the service application.

Duration of a listen mode for receiving a probe request message of a second device, which is received by a first device in a service application used by the small numbers of users can be configured by longer time compared to a service application used by the many numbers of users. Since a counterpart of a service use of the service used by the small numbers of users is limitative, the number of the second device transmitting the probe request message to the first device can be restricted to a limited number. Since it is important (core) for the service application used by the small numbers of users to discover a counterpart device, it is able to configure the service application to securely maintain time longer than prescribed time to discover a counterpart device. On the contrary, in case of the service application used by the many numbers of users, discovering a counterpart device is not core compared to the service application used by the small numbers of user. Since the service application used by the many numbers of users discovers counterpart devices of specified masses or counterpart devices of unspecified masses, the total device discovery time can be reduced in a manner of saving listen mode operation time for receiving probe request messages of a plurality of devices. Table 1 in the following shows an example of differently configuring the listen mode operation time according to a service application. In case of a service application such as data transfer or multimedia streaming, time of operating in a listen mode can be configured to be maintained for more than prescribed time in a manner of being configured by 100, 200 or 300 msec (TU). In case of an advertisement or SNS, time of operating in the listen mode can be configured by 10, 20 or 30 msec (TU) to save time.

TABLE 1

| Application | Listen mode operation time |
| --- | --- |
| Data transfer | 100, 200, 300 msec |
| Multimedia streaming | 100, 200, 300 msec |
| advertisement | 10, 20, 30 msec |
| SNS | 10, 20, 30 msec |

Specifying Social Channel in Search and Listen Mode

The total device discovery time can be reduced by specifying a social channel of a device operating in a search and a listen mode according to a service application.

As mentioned in the foregoing description, a device generally discovers a counterpart device by alternately switching a search mode and a listen mode after a scanning phase is completed. In this case, channel hopping is performed on 3 social channels (channel 1, 6 and 11) among the whole channels to find a counterpart device in general. In order to discover the counterpart device using the aforementioned scheme, a first device (seeker) and a second device (target device) operate on an identical channel among the 3 channels. If the first device operates in the search mode, the second device should operate in the listen mode for receiving a probe request message. Since the counterpart device is discovered only when the aforementioned conditions are satisfied, time elapsed in the aforementioned procedure cannot be ignored and the time acts as delay. Hence, if a channel is specified (restricted) among the 3 social channels according to a service application, since it relieves the condition that channels of two devices should be identical to each other, delay can be reduced. As shown in FIG. 11, if a channel 1 is specified among the social channels according to a service application to be used by the first device, since the second device can also discover a device on the channel 1 while switching the search mode and the listen mode, operation time on the channel 6 or the channel 11 can be reduced.

Reducing Minimum Standby Time

The first device intending to discover a counterpart device transmits a probe request message in a search mode and receives a probe response message from the counterpart device. The first device operating in the search mode can transmit the probe request message using one transmission scheme selected from the group consisting of unicast, multicast and broadcast transmission scheme. The second device can transmit the probe response message using the unicast or the multicast scheme. Minimum standby time corresponds to standby time taken until the probe response message is received after the probe request message is transmitted. If the probe request message is transmitted on a single channel among the 3 social channels (channel 1, 6 and 11) and the probe response message is not received for prescribed time, since the first device transmits the probe request message again in a manner of performing channel hopping to a different social channel and stands by to receive the probe response message, controlling reference time for determining standby time, i.e., controlling minimum standby time may impact on reducing the total device discovery time.

Since the service application used by the small numbers of users is targeting users equal to or less than prescribed number, if a counterpart device does not exist on a corresponding channel, it may be preferable to hop to a different social channel and perform a device discovery procedure. On the contrary, since it is preferable for the service application used by the many numbers of users to receive probe response messages from counterpart devices as many as possible, it may be preferable to secure minimum standby time equal to or longer than prescribed time. Table 2 in the following shows an example of configuring the minimum standby time according to a service application.

TABLE 2

| Application | Minimum standby time |
|---|---|
| Data transfer | 5 msec |
| Multimedia streaming | 5 msec |
| advertisement | 10, 15 msec |
| SNS | 10, 15 msec |

Determining Whether to Perform Scanning Phase

The total device discovery time can be reduced in a manner of differentiating whether to perform a scan phase according to a service application. As mentioned in the foregoing description, a scan phase is performed to search for all available channels on which the first device is operable. If device discovery is performed after the scan phase, a P2P group is formed and a channel to be used in the group is determined. In this case, necessary channel information corresponds to channel information scanned in the scan phase. Hence, the first device performs P2P communication on a channel with which an optimal condition is equipped. Hence, the scan phase, which is performed prior to the device discovery, seems a little early. And, if scanning an optimal channel is performed before a device is discovered, it may not efficiently use the total device discovery time. Hence, the total device discovery time can be reduced in a manner of differentiating whether to perform the scan phase according to a service application.

First of all, examples of a service application used by the small numbers of users may include a data transfer service application and a multimedia streaming service application. In this case, high-capacity data is transmitted in general. In order to transmit the high-capacity data, searching for (scanning) an optimal channel between devices acts as an important element for the whole communication. Hence, in case of the service application used by the small numbers of users, since the scan phase is one of important phases, it is necessary to perform the scan phase for prescribed time before a device discovery phase is performed.

On the contrary, examples of a service application used by the many numbers of users may include an advertisement service application or an SNS (social network service) service application. In this case, since data of low capacity is transmitted in general and mobility is high, it may be more effective to reduce delay of a device discovery procedure rather than searching for an optimal channel of fast transmission speed. Hence it may be able to consider a method of omitting a scan phase for the service application used by the many numbers of users. Table 3 in the following shows whether to perform a scan phase according to a service application.

TABLE 3

| Application | Whether to perform scan phase |
|---|---|
| Data transfer | o |
| Multimedia streaming | o |
| advertisement | x |
| SNS | x |

Yet, as shown in Table 3, it may be impossible to divide whether to perform a scan phase according to a service application. In some cases, the service application used by the many numbers of users may find out an optimal channel and perform communication. Hence, instead of not performing the scan phase, it is able to reduce the total device discovery time in a manner of configuring scanning time shorter than scanning time of the service application used by the small numbers of users.

Figure 12:
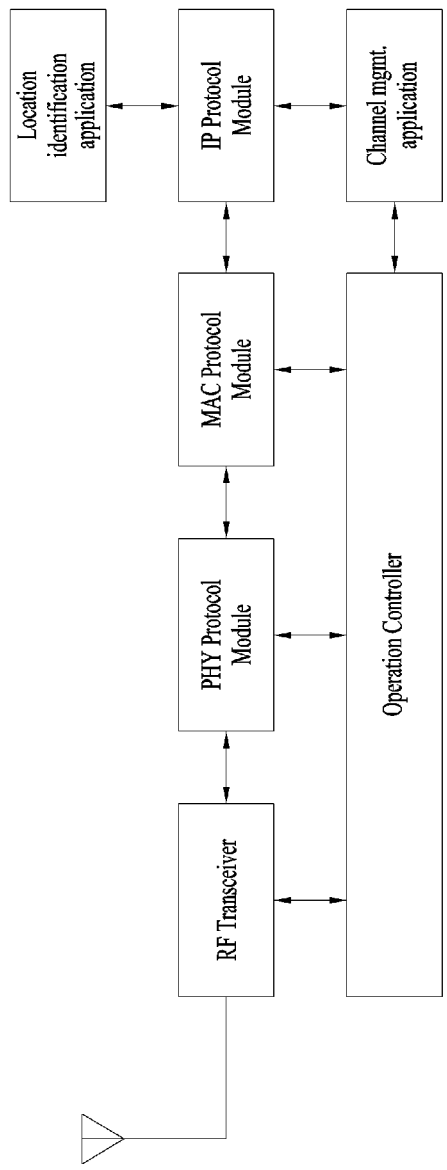
FIGS. 12 and 13 are simple diagrams for a WFD device applied to the present invention.

FIG. 12 is a simple diagram for a WFD device applied to the present invention.

In FIG. 12, an RF transceiver is explained. The RF transceiver moves information made in a PHY module to a PF spectrum and transmits the information via an antenna after filtering, amplification and the like are performed on the information. Or, the transceiver moves an RF signal received through the antenna to a band on which the RF signal is capable of being processed by the PHY module and the transceiver is in charge of a function of processing such a procedure as filtering and the like. A switch function and the like for switching a transmission function and a reception function of the transceiver can be included in the transceiver.

A PHY protocol module is explained. The PHY protocol module performs such a processing as FEC encoding, modulation, inserting an additional signal such as a preamble, a pilot, etc. on data required by a MAC module and performs a role of delivering the data to the RF transceiver. At the same time, the PHY protocol module performs a role of delivering a reception signal delivered from the RF transceiver to the MAC module via such a procedure as demodulation, equalization, FEC decoding and elimination of a signal added by the PHY layer. To this end, the PHY module can include a modulator, a demodulator, an equalizer, a FEC encoder, a FEC decoder etc.

Subsequently, a MAC protocol module is explained. The MAC protocol module performs a procedure necessary for delivering and transmitting data delivered from a higher layer to the PHY protocol module. The MAC protocol module is in charge of additional transmission to make basic communication to be performed. To this end, the MAC protocol module processes data required by a higher layer in a form appropriate for transmitting the data and delivers and transmits the data to the PHY protocol module. And, the MAC protocol module processes data delivered from the PHY protocol module and plays a role in delivering the processed data to the higher layer. The MAC protocol module is also in change of processing a communication protocol in a manner of being in charge of additional transmission and reception necessary for delivering the data.

Figure 13:
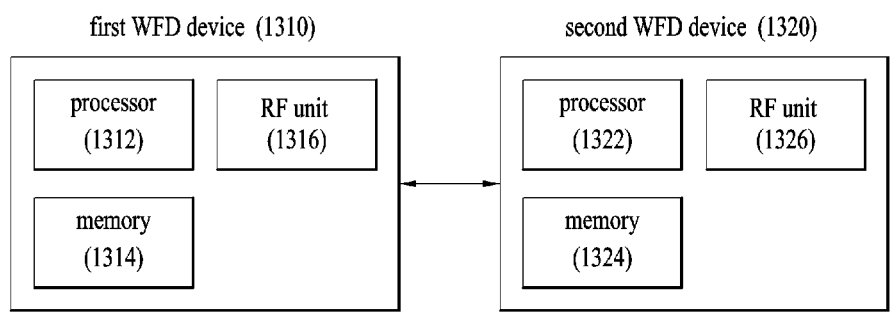

FIG. 13 is a different simple diagram for a WFD device applied to the present invention.

Referring to FIG. 13, a WFD network includes a first WFD device 1310 and a second WFD device 1320. The first WFD device 1310 includes a processor 1312, a memory 1314 and an RF (radio frequency) unit 1316. The processor 1312 can be configured to implement the proposed functions, processes and/or methods. The memory 1314 is connected with the processor 1312 and then stores various kinds of information associated with an operation of the processor 1312. The RF unit 1316 is connected with the processor 1312 and transmits and/or receives a radio signal. The second WFD device 1320 includes a processor 1322, a memory 1324 and an RF unit 1326. The processor 1322 can be configured to implement the proposed functions, processes and/or methods. The memory 1324 is connected with the processor 1322 and then stores various kinds of information associated with an operation of the processor 1322. The RF unit 1326 is connected with the processor 1322 and transmits and/or receives a radio signal. The first WFD device 1310 and/or the second WFD device 1320 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of efficiently transmitting feedback in a multi-antenna wireless communication system and an apparatus therefor are described with reference to examples applied to 3GPP LTE system, it may be applicable to various kinds of wireless communication systems as well as the 3GPP LTE system.

What is claimed is:

1. A method of performing device discovery in a wireless communications system supporting Wi-Fi Direct, the method comprising:
    scanning all available channels by a first device;
    transmitting a probe request message by the first device to a second device;
    and receiving a probe response message from the second device in response to the probe request message,
    wherein the first device is configured to transmit the probe request message in a search mode (search state) and receive the probe request message in a listen mode (listen state),
    wherein a communication channel is configured according to every specific application when the first device operates in the search mode,
    and wherein an operation time of the first device operating in the listen mode is determined based on an application of a Wi-Fi Direct service (WFDS) to be used by the first device with the second device.

2. The method of claim 1, wherein the operation time of the first device operating in the listen mode, when the application is related to a service with a number of devices that is equal to or less than a prescribed number of devices, is configured to be longer than the operation time of the first device operating in the listen mode when the application is related to a service with a number of devices exceeding the prescribed number of devices.

3. The method of claim 2, wherein the service with a number of devices equal to or less than the prescribed number of devices comprises a data transfer service and a multimedia streaming service.

4. The method of claim 2, wherein the service with a number of devices exceeding the prescribed number of devices comprises an advertisement and a social network service (SNS).

5. The method of claim 1, wherein a minimum standby time, is a time from the transmission of the probe request message to the reception of the probe response message by the first device, and wherein the minimum standby time for an application related to a service with a number of devices equal to or less than a prescribed number of devices is configured to be shorter than the minimum standby time for an application related to a service with a number of devices that exceeds the prescribed number of devices.

6. The method of claim 1, wherein an amount of time for scanning all available channels by the first device, when the application is related to a service with a number of devices equal to or less than a prescribed number of devices is configured to be longer than the amount of time for scanning when the application is related to a service with a number of devices exceeding the prescribed number of devices.

7. The method of claim 1, wherein the probe request message corresponds to a message transmitted by the first device operating in the search mode and wherein the probe response message corresponds to a message received by the first device while the second device is operating in the listen mode.

8. The method of claim 1, wherein a scheme of transmitting the probe request message, which is transmitted by the first device, corresponds to one selected from the group consisting of a unicast transmission scheme, a multicast transmission scheme and a broadcast transmission scheme.

9. The method of claim 1, wherein the Wi-Fi Direct service comprises at least one selected from the group consisting of a send service, a play service, a print service and a display service.

10. A method of performing device discovery in a wireless communication system supporting Wi-Fi Direct, the method comprising:

receiving a probe request message received by a second device from a first device;

and transmitting a probe response message to the first device in response to the probe request message, wherein the second device is configured to transmit the probe request message in a search mode (search state) and receive the probe request message from a different device in a listen mode (listen state), wherein a communication channel is configured according to every specific application when the first device operates in the search mode, and wherein an operation time of the second device operating in the listen mode is determined based on an application of a Wi-Fi Direct service (WFDS) to be used by the second device with the first device.

11. A first device performing device discovery in a wireless communication system supporting Wi-Fi Direct, comprising:

a transceiver;

and a processor, that:

controls the first device to scan all available channels, and controls the transceiver to transmit a probe request message to a second device and to receive a probe response message from the second device in response to the probe request message, wherein the first device is configured to transmit transmits a the probe request message in a search mode (search state) and receive the probe request message from a different device in a listen mode (listen state), wherein a communication channel is configured according to every specific application when the first device operates in the search mode, and wherein an operation time of the first device operating in the listen mode is determined based on an application of a Wi-Fi Direct service (WFDS) to be used by the first device with the second device.

* * * * *